(12) United States Patent
     Leborgne

(10) Patent No.: US 10,369,594 B2
(45) Date of Patent: Aug. 6, 2019

(54) FIBER APPLICATION HEAD WITH A SPECIFIC APPLICATION ROLL

(71) Applicant: CORIOLIS GROUP, Lyons (FR)

(72) Inventor: Olivier Leborgne, Lorient (FR)

(73) Assignee: Coriolis Group, Queven (FR)

( * ) Notice: Subject to any disclaimer, the term of this patent is extended or adjusted under 35 U.S.C. 154(b) by 118 days.

(21) Appl. No.: 15/562,955

(22) PCT Filed: Mar. 24, 2016

(86) PCT No.: PCT/FR2016/000057
     § 371 (c)(1),
     (2) Date: Sep. 29, 2017

(87) PCT Pub. No.: WO2016/156677
     PCT Pub. Date: Oct. 6, 2016

(65) Prior Publication Data
     US 2018/0111341 A1     Apr. 26, 2018

(30) Foreign Application Priority Data
     Apr. 1, 2015   (FR) ...................................... 15 00676

(51) Int. Cl.
     *B29C 70/38*      (2006.01)
     *B05D 7/00*       (2006.01)
     (Continued)

(52) U.S. Cl.
     CPC ............ *B05D 7/52* (2013.01); *B29C 35/0805* (2013.01); *B29C 70/384* (2013.01);
     (Continued)

(58) Field of Classification Search
     CPC .............................. B29C 70/384; B29C 70/388
     See application file for complete search history.

(56) References Cited

U.S. PATENT DOCUMENTS 494,910 A     4/1893  Wells
1,100,829 A   6/1914  Joseph
              (Continued)

FOREIGN PATENT DOCUMENTS

DE     1 922 327 U    8/1965
DE     37 43 485      7/1989
       (Continued)

OTHER PUBLICATIONS

PCT International Search Report with English translation for PCT/FRF2016/000057, dated Jun. 30, 2016, 4 pgs.
(Continued)

*Primary Examiner* — Jeffry H Aftergut
(74) *Attorney, Agent, or Firm* — Patterson Thuente Pedersen, P.A.

(57) ABSTRACT

The invention relates to a fiber application head for manufacturing composite material pars and to a corresponding manufacturing method, said head including:
  an application roll for applying a band formed of one or more fibers onto an application surface;
  a main guide system for guiding at least one fiber towards said application roll;
  a heating, system capable of emitting thermal radiation towards the band just before application by the application roll;
  a cooling system capable of cooling, the application roll from the outside, such as a gas flow; and
  a drive system capable of rotating the application roll when the roll is not in contact with the application surface.

12 Claims, 3 Drawing Sheets

(51) Int. Cl.
    *B29C 35/08*     (2006.01)
    *B29C 35/16*     (2006.01)
(52) U.S. Cl.
    CPC .... *B29C 70/388* (2013.01); *B29C 2035/0822* (2013.01); *B29C 2035/0838* (2013.01); *B29C 2035/1658* (2013.01)

(56) References Cited

U.S. PATENT DOCUMENTS

| | | |
|---|---|---|
| 1,164,303 A | 12/1915 | Nicewarner |
| 1,301,354 A | 4/1919 | Baird |
| 3,206,429 A | 9/1965 | Broyles et al. |
| 3,238,084 A | 3/1966 | Hawkins |
| 3,265,795 A | 8/1966 | Medney |
| 3,300,355 A | 1/1967 | Adams |
| 3,563,122 A | 2/1971 | De Neui |
| 3,662,821 A | 5/1972 | Saxon |
| 3,713,572 A | 1/1973 | Goldsworthy et al. |
| 3,856,052 A | 12/1974 | Feucht |
| 4,118,814 A | 10/1978 | Holtom |
| 4,242,160 A | 12/1980 | Pinter et al. |
| 4,351,588 A | 9/1982 | Weiss et al. |
| 4,461,669 A | 7/1984 | Dontscheff |
| 4,488,466 A | 12/1984 | Jones |
| 4,562,033 A | 12/1985 | Johnson et al. |
| 4,569,716 A | 2/1986 | Pugh |
| 4,574,029 A | 3/1986 | Murray |
| 4,699,031 A | 10/1987 | D'Angelo et al. |
| 4,714,509 A | 12/1987 | Gruber |
| 4,717,330 A | 1/1988 | Sarh |
| 4,735,672 A | 4/1988 | Blad |
| 4,849,150 A | 7/1989 | Kittaka et al. |
| 4,881,998 A | 11/1989 | Youngkeit |
| 4,976,012 A | 12/1990 | McConnell |
| 4,990,213 A | 2/1991 | Brown et al. |
| 4,992,133 A | 2/1991 | Border |
| 4,997,513 A | 3/1991 | Lengen et al. |
| 5,015,326 A | 5/1991 | Frank |
| 5,078,592 A | 1/1992 | Grimshaw et al. |
| 5,087,187 A | 2/1992 | Simkulak et al. |
| 5,110,395 A | 5/1992 | Vaniglia |
| 5,200,018 A | 4/1993 | Gill et al. |
| 5,290,389 A | 3/1994 | Shupe et al. |
| 5,397,523 A | 3/1995 | Curry |
| 5,447,586 A | 9/1995 | Tam |
| 5,587,041 A | 12/1996 | Sandusky et al. |
| 5,645,677 A | 7/1997 | Cahuzac et al. |
| 5,700,347 A | 12/1997 | McCowin |
| 5,766,357 A | 6/1998 | Packer et al. |
| 6,026,883 A | 2/2000 | Hegerhorst et al. |
| 6,073,670 A | 6/2000 | Koury et al. |
| 6,251,185 B1 | 6/2001 | Morrison et al. |
| 6,256,889 B1 | 7/2001 | Zuro |
| 6,451,152 B1 | 9/2002 | Holmes et al. |
| 6,458,309 B1 | 10/2002 | Allen et al. |
| 6,490,990 B1 | 12/2002 | Hamlyn et al. |
| 6,540,000 B1 | 4/2003 | Darrieux et al. |
| 6,605,171 B1 | 8/2003 | Debalme et al. |
| 7,048,024 B2 | 5/2006 | Clark et al. |
| 7,819,160 B2 | 10/2010 | Hamlyn et al. |
| 7,926,537 B2 | 4/2011 | Hamlyn et al. |
| 8,052,819 B2 | 11/2011 | Munaux et al. |
| 8,057,618 B2 | 11/2011 | Hamlyn |
| 8,191,596 B2 | 6/2012 | Hamlyn et al. |
| 8,733,417 B2 * | 5/2014 | Hamlyn ............... B29C 70/384 156/433 |
| 2002/0014715 A1 | 2/2002 | Wirth et al. |
| 2002/0090408 A1 | 7/2002 | Dahl et al. |
| 2002/0152860 A1 | 10/2002 | Machamer |
| 2003/0118681 A1 | 6/2003 | Dahl |
| 2004/0031879 A1 | 2/2004 | Kay et al. |
| 2004/0079838 A1 | 4/2004 | Simpson et al. |
| 2004/0103948 A1 | 6/2004 | Scheelen et al. |
| 2005/0023414 A1 | 2/2005 | Braun |
| 2005/0037195 A1 | 2/2005 | Warek |
| 2005/0039844 A1 | 2/2005 | Engwall et al. |
| 2005/0061422 A1 | 3/2005 | Martin |
| 2005/0236735 A1 | 10/2005 | Oldani et al. |
| 2006/0127635 A1 | 6/2006 | Colson et al. |
| 2006/0162143 A1 | 7/2006 | Nelson et al. |
| 2006/0169118 A1 | 8/2006 | Morehead |
| 2006/0180264 A1 | 8/2006 | Kisch et al. |
| 2006/0231682 A1 | 10/2006 | Sarh |
| 2007/0044919 A1 | 3/2007 | Hoffmann |
| 2007/0044922 A1 | 3/2007 | Mischler et al. |
| 2008/0093026 A1 | 4/2008 | Naumann |
| 2008/0105785 A1 | 5/2008 | Griess et al. |
| 2008/0157437 A1 | 7/2008 | Nelson et al. |
| 2008/0196825 A1 | 8/2008 | Hamlyn |
| 2008/0202691 A1 | 8/2008 | Hamlyn et al. |
| 2008/0216961 A1 | 9/2008 | Hamlyn et al. |
| 2008/0216963 A1 | 9/2008 | Hamlyn et al. |
| 2009/0311506 A1 | 12/2009 | Herbeck et al. |
| 2010/0252183 A1 | 10/2010 | Munaux et al. |
| 2011/0011537 A1 * | 1/2011 | Hamlyn ............... B29C 70/384 156/436 |
| 2011/0011538 A1 | 1/2011 | Hamlyn et al. |
| 2014/0165337 A1 | 6/2014 | De Mattia |
| 2018/0093433 A1 | 4/2018 | Treiber et al. |

FOREIGN PATENT DOCUMENTS

| | | |
|---|---|---|
| DE | 10 2007 009 124 A1 | 8/2008 |
| EP | 0 216 695 A1 | 4/1987 |
| EP | 0 241 251 A1 | 10/1987 |
| EP | 0 557 158 A1 | 8/1993 |
| EP | 0 626 252 | 11/1994 |
| EP | 0 753 394 | 1/1997 |
| EP | 0 773 099 A1 | 5/1997 |
| EP | 1 001 066 | 5/2000 |
| EP | 1 177 871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 | 6/1989 |
| FR | 2 686 080 | 7/1993 |
| FR | 2 721 548 | 12/1995 |
| FR | 2 784 930 | 4/2000 |
| FR | 3 006 938 A1 | 12/2004 |
| FR | 2 865 156 | 7/2005 |
| FR | 2 882 681 | 9/2006 |
| FR | 2 913 365 | 9/2008 |
| FR | 2 948 058 A1 | 1/2011 |
| GB | 2 268 705 A | 1/1994 |
| GB | 2 270 672 | 3/1994 |
| GB | 2 292 365 A | 2/1996 |
| JP | 01 281247 | 11/1989 |
| JP | 2005-007252 | 1/2005 |
| JP | 2005329593 | 12/2005 |
| WO | WO 95/20104 | 7/1995 |
| WO | WO 02/070232 | 9/2002 |
| WO | WO 03/035380 A1 | 5/2003 |
| WO | WO 2006/060270 A1 | 6/2006 |
| WO | WO 2006/092514 A2 | 9/2006 |
| WO | WO 2008/149004 A1 | 12/2008 |
| WO | WO 2015/018801 A1 | 12/2008 |
| WO | WO 2010/049424 A1 | 5/2010 |
| WO | WO 2013/072583 A2 | 5/2013 |

OTHER PUBLICATIONS

English translation of Written Opinion of the ISA for International Application No. PCT/FR2016/000057, dated Oct. 12, 2017, 8 pages.
English translation of Written Opinion of the ISA for International Application No. PCT/FR2016/000043, dated Jul. 19, 2016, 6 pages.
Search Report for PCT/FR2016/000043, dated Jul. 19, 2016, 7 pages.
English translation of Written Opinion of the ISA for International Application No. PCT/FR2016/000043, dated Sep. 28, 2017, 10 pages.

(56) References Cited

OTHER PUBLICATIONS

Search Report dated Jul. 2, 2010 for PCT Application No. PCT/EP2010/054377, 12 pages.
French Search Report dated Apr. 13, 2010 for French Application No. 09 54963, 7 pages.
French Search Report dated Apr. 15, 2010 for French Application No. 09 54964, 8 pages.
Application and File history for U.S. Appl. No. 15/558,821, filed Sep. 15, 2017. Inventor: Treiber et al.
Application and File history for U.S. Appl. No. 11/666,537, filed Nov. 26, 2008. Inventors: Hamlyn et al.
Evans, Don O., et al. "Fiber Placement Process Study," SAMPE 34.sup.th Symposium Book of Proceedings, May 8-11, 1989, pp. 1-12.

\* cited by examiner

FIBER APPLICATION HEAD WITH A SPECIFIC APPLICATION ROLL

RELATED CASES

The present application is a National Phase entry of PCT Application No. PCT/FR2016/000057, filed Mar. 24, 2016, which claims priority from FR Patent Application No. 1500676, filed Apr. 1, 2015, which applications are hereby incorporated by reference in their entireties.

TECHNICAL FIELD

The present invention relates to a fiber application head for a fiber application machine for the production of composite material parts, and more particularly to a so-called fiber placement head equipped with a specific application roll. The present invention also relates to a method for manufacturing composite material parts by means of a corresponding application head.

BACKGROUND ART

There are known fiber application machines, commonly called fiber placement machines, for the application by contact onto a laying up tool, such as a male or female mold, of a wide band formed of several continuous flat fibers, of ribbon type, dry or impregnated with thermosetting or thermoplastic resin, in particular carbon fibers consisting of a multitude of carbon threads or filaments.

These machines are used to produce preforms formed of several superposed plies, each ply being formed by laying up onto the mold of one or more bands side by side. In the case of a layup of fibers pre-impregnated with thermoplastic or thermosetting resin, typically of a quantity of at least 40% in weight, the pre-impregnated preform obtained after laying up is hardened or polymerized by passing it through an oven to obtain a composite material part. In the case of so-called dry fibers, which are not pre-impregnated with resins, the fibers comprise a reduced quantity of so-called bonding resin, also called a binder, generally a thermoplastic resin, in a quantity of less than or equal to 5% in weight, to give a tackiness to the fibers during the laying up. After laying up, the so-called dry preform is subjected to a resin injection or infusion operation before the curing step.

These machines, such as described in the patent document WO2006/092514, typically comprise a fiber application head, a system for moving the head, fiber storage means, and fiber conveying means for conveying the fibers from the storage means to the head. The head typically comprises an application roll, also called a compacting roll, intended to come into contact with the mold for applying the band, and means for guiding the fibers on the application roll.

The head generally further comprises a heating system for heating the fibers. The compacting roll presses the band of fibers against the application surface of the mold, or against the band (s) of fibers previously applied, in order to facilitate the adhesion of the applied bands to each other, as well as to progressively discharge the air trapped between the laid bands. The heating system ensures the heating of the bands of fibers to be applied, and/or of the mold or bands already applied upstream of the compacting roll, just before the compacting of the band, in order to at least soften the pre-impregnation resin or bonding resin, and thus promote adhesion of the bands to one another.

In the case of thermosetting resins, the pre-impregnated fibers are simply heated to soften them, typically at temperatures in the order of 40° C. The heating system typically comprises an infrared heating system comprising one or more infrared lamps.

In the case of thermoplastic resins, the fibers pre-impregnated or having a binder must be heated at higher temperatures, at least up to the resin melting temperature, being in the order of 200° C. for nylon type resins, and up to about 400° C. for PEEK type resins.

To achieve these higher temperatures, hot air torch systems have been proposed, and more recently laser type heating systems to achieve accurate and concentrated heating. Due to the higher heating temperatures, the fiber placement heads are typically equipped with metallic compacting rolls, resistant to heat, which can furthermore be cooled by the interior via a water circuit. To be able to adapt itself to the profile of the application surface, segmented metallic compacting rolls have been proposed, comprising several roll segments independently mounted side by side on a same axle, each segment being radially moveable and in an independent manner, and being elastically biased against the application surface. These segmented metallic rolls have proven however to be complex in structure and implementation.

Flexible rolls formed from a so-called high temperature elastomer, including a thermal stabilizer, are also used. To cool them, it has been proposed to equip the placement heads with a cooling system capable of delivering an air flow to cool the roll from the outside or from the inside, as described in patent document FR 2948058. Despite these cooling systems, the flexible rolls can have the tendance to deteriorate rapidly in the case of the use of thermoplastic resins.

SUMMARY OF THE INVENTION

The purpose of embodiments of the present invention is to propose a solution intended to overcome the aforementioned drawbacks, which makes it possible in particular to process a wide variety of resins, both thermosetting and thermoplastic, with a compaction substantially uniform over the applied band, and which is simple in design and implementation.

To this end, embodiments of the present invention proposes a fiber application head for the production of composite material parts, comprising an application roll for the application of a band formed of one or more fibers onto an application surface,
a main guide system for guiding at least one fiber towards the application roll, and
a heating system capable of emitting thermal radiation in the direction of the band, just before application by the application roll,
a cooling system capable of cooling the application roll from the outside, such as a gas flow,
characterized in that the head comprises a drive system, preferably motorized, capable of rotating the application roll, when the roll is not in contact with the application surface, outside the layup trajectories.

According to embodiments of the invention, the head is equipped with a drive system for rotating the roll in order to rotate the roll when the latter is no longer in contact with the application surface, so that the entire outside surface of the roll is brought to the level of the cooling system, for example in a position facing a gas flow emitted by the cooling system, and thus optimize the cooling of the roll when the head is not applying fibers, between two lay up trajectories.

This rotational drive of the roll ensures a more efficient and homogeneous cooling of the roll between two layup trajectories, and thus makes it possible to limit, or even eliminate, overheating of the application roll, in particular in the case of a flexible roll.

According to one embodiment, the drive system comprises at least one motorized drive means, driven in rotation by a motor, able to be moved between an inactive position in which said drive means is remote from the application roll, and an active position in which said drive means is in contact with the application roll to positively drive the latter in rotation. According to one embodiment, the application roll being mounted free to rotate around its rotation axis, the drive system comprises at least one motorized drive roller, driven in rotation by a motor, with an axis of rotation parallel to the axis of rotation of the application roll, the roller being able to be moved between an inactive position in which the roller is remote from the outer cylindrical surface of the application roll, and an active position in which the roller is in contact with the outer cylindrical surface of the application roll to positively drive the latter in rotation. According to another embodiment, the drive roller cooperates with one of the ends of the axle of the roll, with which the roll is fixed in rotation, the drive roller coming into the active position in contact with the roll axis.

According to one embodiment, the drive system comprises actuating means, for example of the cylinder type, for automatically moving the roller between its two positions, for example by a pivoting movement. The roller is for example driven in rotation by an electric motor, the latter preferably being controlled to drive the roller only when the latter is in the active position.

According to one embodiment, the cooling system is capable of emmitting a gas flow in the direction of the application roll in order to cool the application roll from the outside, the gas flow being directed onto a portion of the cylindrical outer surface of the application roll. In the absence of the rotation of the roll, the gas flow cannot be oriented towards the entire outer surface of the roll, and cannot particularly be oriented towards the portion of the outer surface through which the roll is intended to come into contact with the application surface, or towards the portion of the outer surface facing the heating system. According to one embodiment, the cooling system is capable of emitting a gas flow at ambient temperature, preferably between 15° C. and 30° C., or a gas flow cooled to a temperature of less than 15° C., preferably an air flow. According to one embodiment, the cooling system comprises a deflector or nozzle fed with a gas flow, the nozzle partially covering the cylindrical outer surface of the roll on a portion of the surface opposite to the heating system. According to one embodiment, the aforementioned drive roller is positioned in the nozzle.

According to other embodiments, the cooling system comprises any suitable means enabling cooling of the roll from the outside, such as for example a cooled roll brought into contact with the compacting roll, the cooled roll also being able to be used to rotationally drive the compacting roll.

According to one embodiment, the heating system is of the laser type. According to another embodiment, the heating system is of the infrared type and comprises at least a first infrared lamp capable of heating the band between its outlet from the main guide system and the area of contact between the application roll and the application surface, and preferably at least one second infrared lamp capable of heating, upstream of the roll, the application surface and/or one or more previously applied bands.

According to one embodiment, the application roll comprises a rigid central tube by which the roll is mounted to rotate on a support structure of the machine, for example in a removable manner via assembly parts, and a cylinder made of a supple or flexible material, elastically deformable, assembled coaxially on the central tube, possibly having an anti-adhesive layer. The cylinder of flexible material allows the compacting roll to adapt itself to the variations in curvature of the application surface and thus to apply a pressure substantially uniform over the whole of the laid band. The cylinder is for example an elastomer, in particular a silicone. The drive system according to the invention is proven to be particularly advantageous in the case of a flexible roll.

According to one embodiment, the head constitutes a fiber placement head comprising cutting means and feeding means, and possibly means for blocking fibers.

Embodiments of the present invention also concern a method for manufacturing a part made of a composite material comprising the application of continuous fibers onto an application surface for example to form a preform comprising several plies of fibers superimposed in different orientations, each ply being made by the application of one or more bands along one orientation, each band being formed of one or more fibers, characterized in that the application of the fibers is carried out by means of a fiber application head such as described previously, by relative movement of the application head in relation to the layup surface along the layup trajectories, the application roll being driven in rotation by the drive system between two layup trajectories, when the roll is no longer in contact with the application surface, in particular during link trajectories between two lay up trajectories, to cool the roll.

The fibers typically used are continuous flat fibers, also called tows, generally unidirectional, and comprising a multitude of filaments. The laid fibers may be dry fibers or fibers pre-impregnated with thermosetting or thermoplastic resin. The fibers typically have widths of ⅛, ¼ or ½ inches. In the present, the term "fibers" also refers to fibers of a greater width, greater than ½ inch, typically called band in placement technology.

According to one embodiment, the roll is cooled from the outside by a gas flow oriented towards its cylindrical outer surface during the application operations, during the layup trajectories and the link trajectories, as well as preferably when the head is in the standby position.

The process according to embodiments of the invention is particularly advantageous in the case of dry preforms made from dry fibers having a binder and/or thermoplastic preforms made from fibers preimpregnated with thermoplastic resin.

In the case of a dry preform, the method further comprises a step of impregnating the resin in the dry preform, by adding one or more impregnation resins by infusion or injection to the dry preform, and a curing step to obtain a composite material part. In the case of a thermoplastic preform, the preform may possibly be subjected to an additional consolidation step in order to obtain a final composite material part. A consolidation in situ can also be obtained during the application of the fibers.

The application of fibers may be carried out on the application surface of a tool to form a preform, such as described previously. According to another embodiment, the application of fibers is carried out directly on the application surface of a prefabricated part, in order to reinforce this part with unidirectional fiber reinforcements, the prefabricated part being for example a part obtained by injection, molding or additive manufacture, from one or more thermoplastic and/or thermosetting resins.

According to one embodiment, the heating system is activated before each layup trajectory, when the roll is not in contact with the application surface, in particularly during the link trajectory between two layup trajectories, in order to guarantee a sufficient heating from the beginning of the layup trajectory. This embodiment is particularly suitable in the case of an infrared heating system, particularly for heating dry fibers or fibers pre-impregnated with thermoplastic resin, the drive means making it possible to avoid the overheating of the roll by the heating system.

BRIEF DESCRIPTION OF THE DRAWINGS

Embodiments of the invention will be better understood, and the other objectives, details, features and advantages will become more clearly apparent from the following detailed explanatory description of a particular currently preferred embodiment of the invention, with reference to the appended schematic drawings in which.

DETAILED DESCRIPTION

FIGS. 1 to 5 illustrate a fiber placement head 1 equipped with a drive system 5 according to embodiments of the invention, enabling the automatic layup by contact onto the application surface 91 of a mold 9 of bands formed by several fibers, by relative movement of the head in relation to the mold via a displacement system.

Figure 1:
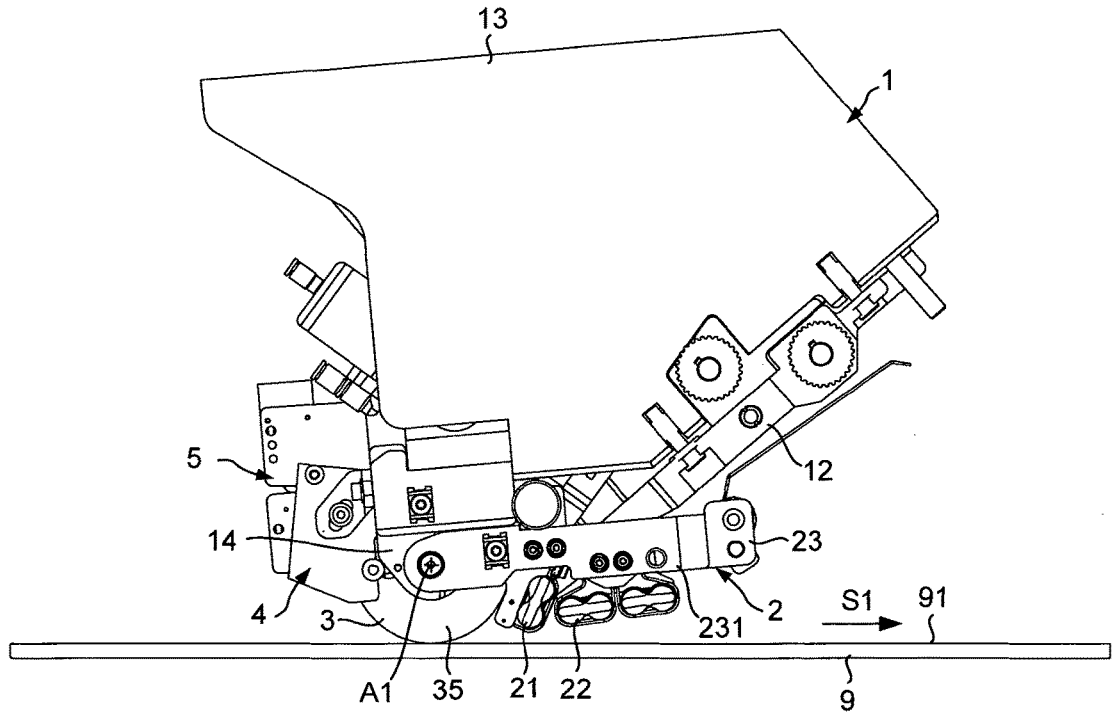
FIG. 1 is a partial schematic side view of a fiber placement head according to one embodiment of the invention.
Figure 2:
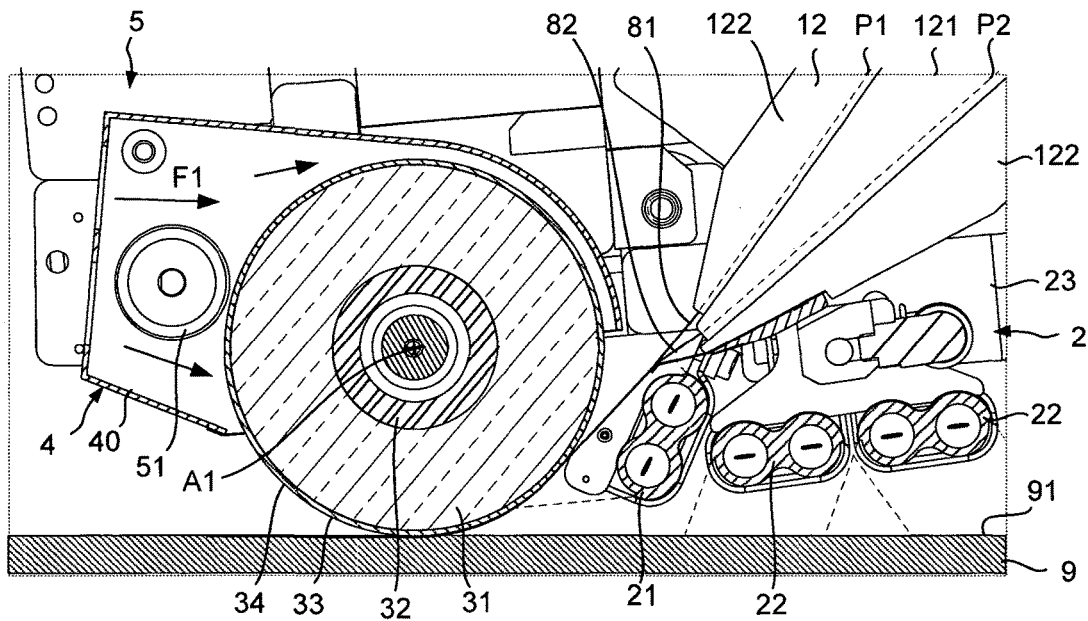
FIG. 2 is a partial schematic cross-sectional view of the head of FIG. 1 illustrating the cooling system and the heating system.

The head 1 comprises a compacting roll 3, a main guide system 12 for guiding the fibers in the direction of the roll in the form of two layers of fibers, in order to form a band of fibers in which the fibers are laid substantially edge to edge. With reference to FIG. 2, the head comprises for example a main guide system such as described in the aforementioned patent document, comprising first guide channels and second guide channels in which pass respectively the first fibers 81 of the first layer and the second fibers 82 of the second layer. The first channels and the second channels are arranged in staggered rows, along two guide planes, shown schematically under the references P1 and P2, approaching each other from upstream to downstream, so that the fibers 81, 82 of the two layers are positioned substantially edge-to-edge at the level of the compacting roll. These guide channels are for example formed at the assembly interface of a central part 121, in the form of a wedge, and two lateral plates 122, 123.

The head comprises a support structure 13 on which the main guide system 12 is mounted and by which the head can be assembled to a displacement system (not shown) which is capable of moving the head in at least three directions perpendicular to each other. The displacement system comprises for example a robot comprising a wrist or multi-articulated arm at the end of which said head is mounted. In a variant, the head is fixed and the mold is capable of being moved in relation to the head to perform the laying up operations. The fibers are conveyed from storage means (not shown) to the head via the conveying means (not shown). The fiber storage means may comprise a creel in the case of fibers packaged in the form of spools. The conveying means may be formed of flexible tubes, each tube receiving one fiber in its internal passage. In a manner known per se, the head comprises cutting means for individually cutting each fiber passing through the main guide system, blocking means for individually blocking each fiber that has just been cut, and feeding means for individually feeding as far as the roll each fiber that has just been cut, in order to be able to stop and resume the application of a fiber at any time, as well as to choose the width of the band. These various means (not shown) are described in particular in the aforementioned patent document. The head is for example designed to accommodate sixteen fibers, and to allow the application of a band of sixteen fibers, for example each 6.35 mm (¼ inch) wide.

The roll 3 is mounted free to rotate about an axis A1 of rotation on two assembly parts 14, through which the roll is mounted removably on the support structure 13. The fiber placement head advantageously comprises a compacting roll capable of adapting itself to the application surface, in particular to convex and/or concave application surfaces in order to ensure a substantially uniform compaction over the entire width of the band. The roll is for example a compacting roll of so-called flexible material, which is elastically deformable by compression. The compacting roll comprises a cylindrical body or cylinder 31 made of a flexible material, such as an elastomer. The cylinder has a central cylindrical passage for its assembly on a support core formed of a central rigid cylindrical tube 32, for example metallic. The cylinder 31 and the central tube 32 are coaxial and are fixed in rotation with one another. The cylinder is advantageously externally coated with an anti-adherent outer layer 33, formed for example here by a teflon film thermo-retracted on the external surface of the cylinder. The teflon film, through which the roll is in contact with the band, limits the adhesion of the roll to the fibers as well as the fouling of the roll. The roll is mounted to rotate by its rigid tube to the two assembly parts via bearings.

The heating system 2 is positioned upstream of the roll in relation to the direction of advancement of the head during the laying up, illustrated by the arrow referenced S1. The heating system is for example of the infrared type, such as described in the patent application filed by the applicant, entitled "Fiber application head comprising a special application roll". It comprises a first infrared radiation lamp 21, called an infrared lamp, for heating the fibers coming out of the main guide system 12, and two second infrared lamps 22, positioned upstream of the first infrared lamp, for heating, upstream of the compacting roll in relation to the direction of advancement of the head, layup surface and/or fibers previously laid. The lamps 21, 22 are mounted on a support system 23 which is assembled to the head, and are positioned parallel to the axis A1 of the compacting roll, while the radiation from the first lamp 21 is directed towards the roll, so that the radiations of the second lamps 22 are oriented towards the application surface. The support system 23 comprises two arms 231 between which the lamps 21, 22 are mounted, the arms being assembled at their first end to the assembly parts 14. The first lamp may also be used to heat the nip area between the roll and the application surface, as well as possibly the part of the application surface or the fibers previously laid which is just upstream of the roll.

The roll is cooled by a cooling system 4 comprising a deflector or nozzle 40 supplied with air. The nozzle is positioned on the side of the roll which is opposite the heating system and extends around the roll to make use of the cylindrical outer surface 34 of the roll over a substantial sector of more than 180°, which is opposite to the application surface. The nozzle also has lateral returns which partially overlap the lateral exterior surfaces 35 of the roll.

The nozzle is supplied with an air flow through pipes (not shown) connected to the nozzle via connectors mounted at the passages 41 (FIG. 3) of the nozzle. The arrows F1 in FIG. 2 represent schematically the flow of air in the nozzle in order to cool the roll. The air flow is for example a pulsed air flow at ambient temperature in the order of 20° C.

The head is furthermore equipped with a drive system 5 capable of driving the roll in rotation when the roll is not in contact with the application surface. The drive system 5 comprises a drive roller 51 connected to the drive shaft of a motor 52 to be driven in rotation around an axis A2, parallel to the axis A1 of the rotation of the roll. The roller is for example mounted rotationally fixed directly on the drive shaft. The motor is mounted on a first plate 53 pivotably mounted around an axis A3 on a support 54. The drive system is mounted on one side of the roll by its support 54 on one of the two assembly parts 14. The roller is positioned in the nozzle, the drive shaft passing through a lateral opening 55 (FIG. 7) of the nozzle 4. The opening 55 advantageously allows the roller to pass through the nozzle when the drive system is mounted on the assembly part.

Figure 5:
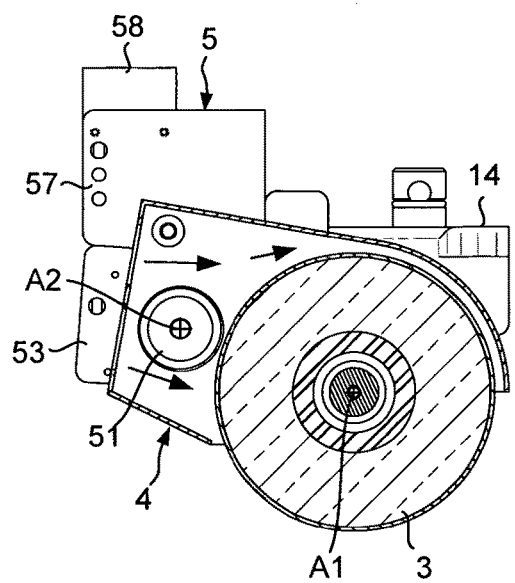
FIG. 5 is a sectional view along the section plane V-V of FIG. 4, illustrating the inactive position of the drive roller.
Figure 7:
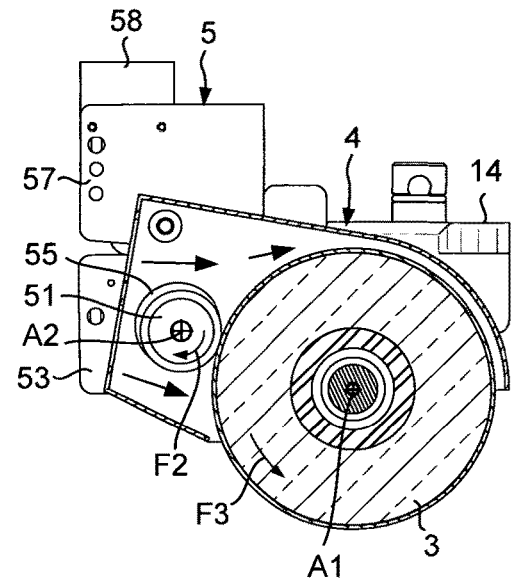

By pivoting the plate around the axis A3, the roller can be moved from a non-active position illustrated in FIG. 5, in which the roller 51 is remote from roll 3, and an active position illustrated in FIG. 7 in which the roller is in contact with the roll and drives the later in rotation.

Figure 3:
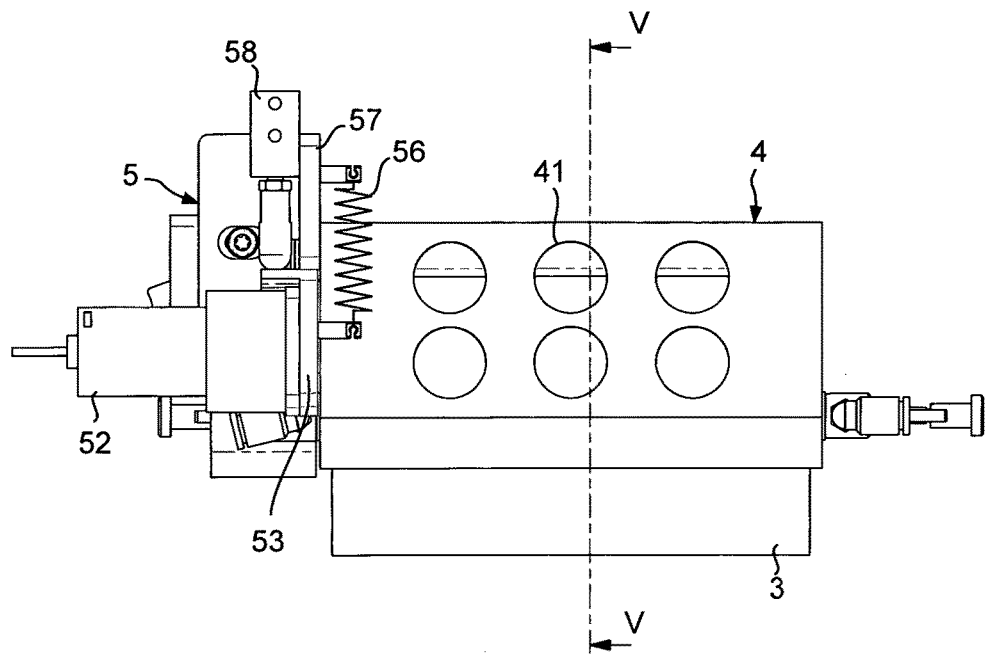
FIGS. 3 and 4 are respectively a front view and a side view of the roll of FIG. 1 equipped with the cooling system and a drive system of the roll according to an embodiment of the invention, with the drive roller in a remote inactive position.
Figure 4:
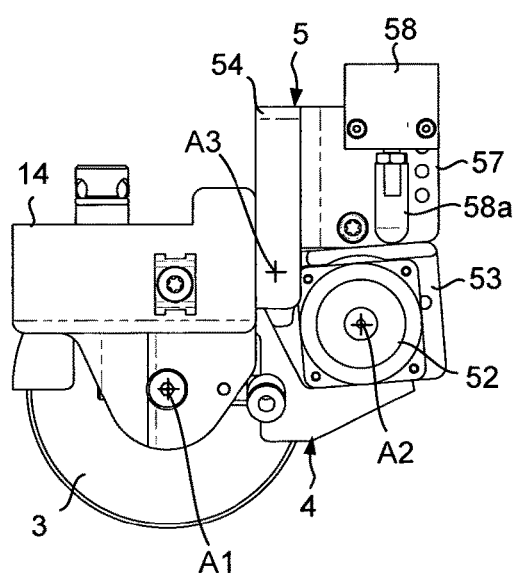
Figure 6:
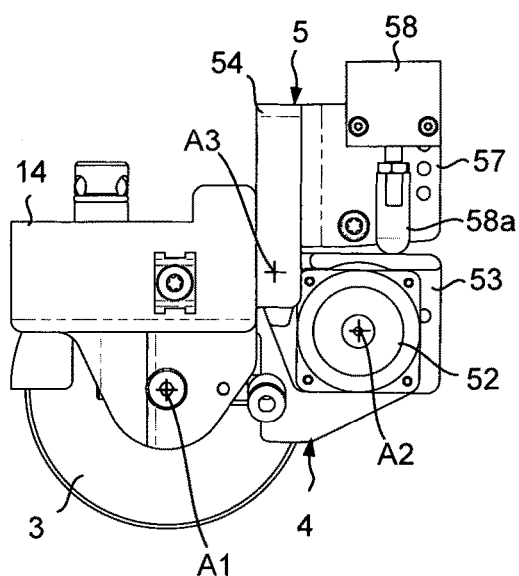
FIGS. 6 and 7 are views similar to those of FIGS. 4 and 5, illustrating the drive roller in the active driving position; and, and FIG. 8 is a schematic top view of the layup surface of a tool illustrating the layup trajectories and the link trajectories of a head according to the invention for the layup of a ply.

The roller is elastically biased towards its remote position via a tension spring, shown schematically under reference 56 in FIG. 3, connected by its ends to the first plate 53 and to a second plate 57 fixedly mounted on the support 54. In this non-active position, the first plate 53 is in abutment against the second plate 57. The displacement of the roller towards its active position is achieved by means of a cylinder 58, fixedly mounted by its cylinder or cylinder body on the second plate, and of which the rod 58a is in contact by its end with the first plate. The movement of the cylinder rod from a rest position illustrated in FIG. 4 to an extended position illustrated in FIG. 6 makes it possible to pivot the first plate 53 against the elastic return of the spring 56 to bring the roller into its active position illustrated in FIG. 4. When the cylinder rod is returned towards its rest position, the plate pivots under the effect of the elastic return of the spring until it comes into abutment against the second plate, the roller being in its remote position. The motor is controlled to drive the roller only when the latter is in the active position, for example the motor drives the roller in the clockwise direction F2 in FIG. 7, so as to drive the roller in the anti-clockwise direction F3.

Figure 8:
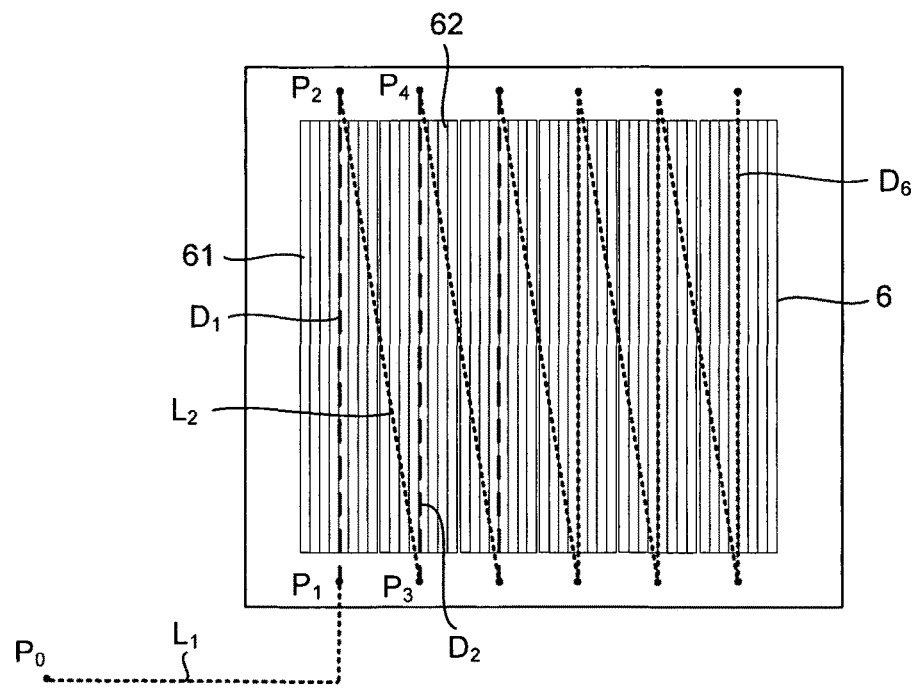

FIG. 8 illustrates an example of the use of the drive system for laying up a ply onto the application surface 91 of the mold 9, the ply 6 being formed here of six parallel bands of eight fibers.

In this example, the infrared lamps 21, 22 of the heating system are activated before laying up a band, during the so-called link trajectories, in particular between two layup trajectories, when the roll is not in contact with the layup surface, so that the heating system is at the maximum of its heating capacity when the fiber descends from the main guide system, and thus attains sufficient heating at the beginning of the trajectory, and is uniform over the entire layup trajectory. Driving the roll in rotation prevents the same portion of the roll from being subjected to the radiation of the first lamp and allows the cooling of the whole of the roll by the cooling system.

In FIG. 8, the link trajectories are shown schematically in dotted lines, and the layup trajectories are shown schematically in broken lines.

For the layup of a ply, the head performs a first link trajectory $L_1$ from an original position or standby position $P_0$ to a position $P_1$ in which the head is in contact with the surface of the mold. During this link trajectory $L_1$, the heating system is activated to preheat the lamps, and the drive roller is moved into its active position by control of the cylinder to rotate the roll. The heating system is activated over the whole link trajectory, or only on part of the layup trajectory for a sufficient duration to reach the desired heating capacity. At point $P_1$ or slightly before reaching point $P_1$, the roller is returned to the inactive position, and the head is moved along with the layup trajectory $D_1$ up to the point $P_2$ to lay the first band 61 of fibers. The head is then moved, without contact with the application surface, along a second link trajectory $L_2$, up to the point $P_3$. During this link trajectory $L_2$, the heating system is deactivated at point $P_2$ and is activated again before reaching point $P_3$, and the drive roller is moved into the active position by command of the cylinder to rotate the roll.

At the point $P_3$, or slightly before reaching the point $P_3$, the roller is returned to the inactive position, and the head is moved along the layup trajectory $D_2$ up to the point $P_4$ to lay the second band 62 of fibers. The other bands of the ply are produced in the same way by moving the head along the layup trajectories and link trajectories. After the layup trajectory for the last band $D_6$, the head performs a link trajectory, to return to the point of origin or to lay the band of the next ply. During this link trajectory, the roll is driven in rotation by the drive roller.

The rotational driving of the roll can be maintained when the head is left on standby in the original position between two layup operations, in order to cool the roll fully before the layup of a ply.

According to an alternative embodiment, the heating system is a laser type heating system, the radiation of which is directed in the direction of the band, just before its compaction, as well as towards the band or bands already laid. The radiation is thus directed obliquely towards the roll to heat a section of the band positioned on the roll, before it is compacted by the latter. The roll used is then advantageously substantially transparent to the radiation emitted by the laser. In the case of laser heating, the heating may be switched off during the link trajectories.

Although embodiments of the invention have been described in conjunction with several specific embodiments, the invention is in no way limited thereto and includes all technical equivalents of the described means as well as their combinations if they are within the scope of the invention.

The invention claimed is:

1. A fiber application head for producing composite material parts, comprising:
   an application roll for the application of a band formed of one or more fibers onto an application surface;
   a main guide system for guiding at least one fiber towards said application roll;
   a heating system capable of emitting thermal radiation in the direction of the band, just before application by the application roll;
   a cooling system capable of cooling the application roll from the outside,
   wherein the head comprises a drive system capable of driving in rotation the application roll, when the roll is not in contact with the application surface.

2. The head according to claim 1, wherein the drive system comprises at least one motorized drive means able to be moved between an inactive position in which said drive means is remote from the application roll, and an active position in which said drive means is in contact with the application roll for positively driving the latter in rotation.

3. The head according to claim 2, wherein the drive system comprises at least one motorized drive roller with an axis of rotation parallel to the axis of rotation of the application roll, said roller being able to be moved between an inactive position in which the roller is remote from the cylindrical outer surface of the application roll, and an active position in which the roller is in contact with the cylindrical outer surface of the application roll for positively driving the latter in rotation.

4. The head according to claim 1, wherein the cooling system is capable of emitting a gas flow in the direction of the application roll.

5. The head according to claim 4, wherein the cooling system comprises a nozzle supplied with a gas flow, the nozzle partially covering the cylindrical outer surface of the roll.

6. The head according to claim 3, wherein the drive roller is positioned in the nozzle.

7. The head according to claim 1, wherein the heating system is of the laser type.

8. The head according to claim 1, wherein the heating system is of the infrared type, and comprises at least one first infrared lamp capable of heating the band between its outlet from the main guide system and the contact area between the application roll and the application surface.

9. The head according, to claim 1, wherein the application roll comprises a rigid central tube by which said roll is mounted to rotate on a support structure of the machine, and a cylinder made of a flexible material, elastically deformable, assembled coaxially on said central tube.

10. The head according to claim 1, wherein the head constitutes a fiber placement head.

11. A method of manufacturing a composite material part comprising the application of continuous fibers onto an application surface, wherein the application of fibers is carried out by means of a fiber application head according to claim 1, by relative movement of the application head in relation to the layup surface along layup trajectories, said application roll being rotationally driven by the drive system between two layup trajectories, when the roll is no longer in contact with the application surface.

12. The method according to claim 11, wherein the heating system is activated before each, layup trajectory, when the roll is not in contact with the application surface, in order to ensure sufficient heating from the beginning of the layup trajectory.

* * * * *